United States Patent Office 2,693,435
Patented Nov. 2, 1954

2,693,435

VITAMIN A ESTER COMPOSITION AND PROCESS OF PREPARING VITAMIN A ESTER

William E. Stieg, New London, and Axel T. Nielsen, Old Mystic, Conn., assignors to Chas. Pfizer & Co., Inc., Brooklyn, N. Y., a corporation of Delaware No Drawing. Application February 1, 1952,
Serial No. 269,578

10 Claims. (Cl. 167—81)

This invention is concerned with a process for preparing esters of vitamin A, and with certain novel products thereby obtained.

Esters of vitamin A, that is, esters of vitamin A alcohol with alkanoic or alkenoic acids having up to about 22 carbon atoms in the chain, are especially useful forms of the vitamin. Particularly the longer chain compounds have high solubility in fats, are excellently stable on storage, and are readily incorporated in various pharmaceuticals, human foods, or animal feeds. For these reasons they are preferred to vitamin A alcohols for therapeutic and other commercial use.

In one method for the manufacture of synthetic vitamin A, the acetate or, if preferred, another lower alkanoic acid ester, is obtained as an end product. This type of compound has been converted to the desirable long-chain fatty acid esters by saponification and re-esterification, for example with a long-chain fatty acid chloride. Such a process has a number of deficiencies. The extra steps of saponification and isolation of the vitamin A alcohol are wasteful, involving decomposition and losses due to oxidation of the vitamin. The use of the long-chain fatty acid chlorides is unsatisfactory, since they are highly corrosive compounds and are unstable, readily hydrolyzing in the presence of moisture with the evolution of hydrogen chloride. A process which would avoid these and other difficulties of known procedures would be obviously of considerable value.

This invention at last provides such a process. Broadly speaking, the present novel method involves transesterifying relatively simple vitamin A esters with longer chain aliphatic non-vitamin esters. The transesterification is achieved by contacting a lower alkanoic acid ester of the vitamin with a longer chain aliphatic ester of an alkanoic or alkenoic acid in the presence of an alkaline catalyst, preferably under substantially anhydrous conditions. More complex mono-esters of fatty acids and the like are thus obtained, and by a process which is much more direct and simpler than the conventional method.

In one preferred embodiment of this invention, a lower alkanoic acid ester of vitamin A, e. g. one where the acid chain contains say between two and six carbon atoms, is reacted with a longer-chain fatty acid ester with which it is desired to form a new vitamin A ester. The reaction is conducted at a mildly elevated temperature to accelerate the process, under substantially anhydrous conditions to minimize undesirable side reactions, and in the presence of an alkaline transesterification catalyst, particularly an alkali metal or alkaline earth metal compound. The desired vitamin A-fatty acid ester is recovered as the product, and the corresponding lower aliphatic alcohol-lower alkanoic acid ester is obtained as the principal by-product.

By heating to a suitable temperature or by lowering the pressure or by both practices, the lowest boiling component of the reaction mass (e. g. the by-product ester of the lower alcohol) can, if desired, be distilled out of the mixture, thus further aiding to force the desired reaction to completion. In particular, the elevation of temperature of the mixture assists in forming a completely liquefied system which is homogeneous and more readily stirred. Certain of the pure esters are solids at room temperature. A range of temperature from about 20° C. to about 80° C. is most suitable for the reaction.

It has been found most important, in order to achieve transesterification at practical rates, to have present in the reaction mixture an alkaline catalyst, preferably an alkali metal or alkaline earth metal compound. The compound chosen is desirably in the form of an alkoxide, particularly a lower aliphatic alcoholate, for example sodium methoxide, lithium methoxide, potassium ethoxide, barium methoxide, calcium methoxide, magnesium isopropoxide and so forth. However, an alkali metal hydroxide or an alkaline earth metal oxide or hydroxide may be used. The catalytic compound need only be used in a low proportion, e. g. 0.20 mole per mole of vitamin A reactant or less; and substantially between 0.01 and 0.1 mole per mole of the vitamin ester is generally enough. It is important that good contact of the catalyst and reactants be obtained, and efficient mechanical agitation is normally maintained for this purpose. The catalyst may be added as a solution or suspension in a suitable solvent such as a lower alcohol. This assists in improving distribution of the catalyst throughout the reaction mass.

Approximately equimolecular proportions of the long chain fatty acid ester and the shorter chain vitamin A ester starting materials are sufficient for the usual reaction. An excess of one or the other constituent can readily be present without harm, however, although little value results therefrom. Either or both reactants may be in crude or purified form, depending on the product desired. A notably useful simple vitamin A ester is the acetate, which is most readily available in commerce. However, vitamin A propionate, butyrate, etc. can also be transesterified by this new process.

In carrying out the process of this invention, the long-chain ester is generally heated in a suitable vessel and, in the case of those esters which are solids, first melted. The vitamin A lower alkanoic acid ester, e. g. the acetate, which also may be a solid in purified form, is mixed with the other reactant and the catalytic metallic compound is introduced. The mixture is stirred well. It is preferable to dry the reactants before addition of the catalyst, so that the desirable anhydrous condition is maintained. Good agitation is necessary to assure sufficient contact of the catalyst and reactants, particularly since certain of the catalysts may have low solubility in the reaction mixtures. The temperature is gradually elevated. Vacuum may be applied to the warm mixture, so that the ester formed from the lower aliphatic alcohol and lower alkanoic acid is distilled off and completion of the reaction accelerated. This by-product can be collected and, when approximately an equimolar proportion thereof has been obtained, the reaction is considered complete. Transesterification may take from one hour to several hours, depending somewhat on the temperature, the catalyst, and the equipment used. In general it is best to heat the reaction mixture above about 20° C. but not much above 80° C. Little or no destruction of the active compound occurs even at 80° C. or somewhat more, and high yields of vitamin A long-chain fatty acid esters are still obtained. Although a high boiling organic solvent like an aromatic hydrocarbon (which must, of course, have a boiling point higher than the by-product ester to be distilled out of the reaction mixture) may be used, this is not the preferred procedure, since it is not essential for high yields and it may increase the difficulty of recovering the compound.

After the reaction has been substantially completed, the product may be dissolved in a suitable solvent, that is, one capable of dissolving the vitamin A-long-chain fatty acid ester but yet of a fairly low boiling point for ease of subsequent removal. Examples of useful solvents are benzene, petroleum ether, chloroform, diethyl ether, methylene dichloride, and so forth. The catalyst may then be removed by washing the organic solvent solution with water or with a dilute acid in just sufficient amount to neutralize the alkaline compound. The organic solution may then be dried and the solvent removed to yield the desired long-chain fatty acid ester of vitamin A. It is obvious that toxic material should not be left in the final reaction mixture or product, if the compound is intended for use in nutrition or in therapy.

One particularly valuable embodiment of the present invention resides in forming novel mixtures of edible oil fatty acid esters of vitamin A. These are a new class of compositions, much more oil-soluble than artificially prepared mixtures of the individual pure fatty acid esters. They are formed directly by heating a lower alkanoic acid ester of vitamin A with at least about a molar proportion of an edible oil in the presence of an alkaline catalyst. The mixed esters products contain fatty acids of the same nature as those present in the original edible oil both saturated and unsaturated acids (cis and trans) forming the esters. Thus, a lower alkanoic acid ester of vitamin A is contacted with a dry, edible oil or fat, either of animal or vegetable origin, such as corn oil, peanut oil, cottonseed oil, pumpkin seed oil, rape seed oil, sesame oil, menhaden oil, tallow, or other animal fats, in accordance with the operating conditions previously discussed. An especially useful product is obtained when vitamin A acetate is heated with corn oil in the presence of a suitable alkali metal or alkaline earth metal catalyst. Corn oil contains a high proportion of glycerol oleate and linoleate, and part of the simple vitamin A ester is converted to the oleate and linoleate, thus considerably increasing the oil solubility of the vitamin. After removal of the catalyst, the mixture may be used as a very convenient source of vitamin A in pharmaceutical preparations, dietary supplements, etc.

As above indicated, it is best to apply heat during the transesterification. The reaction will then quickly reach an equilibrium in which a mixture of the various possible new esters is present.

In preparing these edible oil fatty acid esters of vitamin A, after the reaction mixture has been heated for an hour or two, it should best be cooled and catalytic material removed by washing with water. In general, heating the mass with agitation at about 45°–70° C. for at least about an hour serves to transesterify an appreciable proportion of the reactants. The product obtained will have a very greatly increased solubility in oil and fats, even though the transesterification is only partial. An excess of oil may be used and the vitamin A mixed esters produced need not be separated therefrom but may be marketed directly as a solution in oil having excellent stability and value. If desired, sufficient oil may be used to yield a product having a standard potency, such as 500,000 or 1,000,000 units per gram of solution.

The particularly valuable products which are formed by the use of an edible fat or oil in the reaction described above show a high degree of stability as compared to ordinary esters of vitamin A. The materials prepared, for instance, by contacting vitamin A acetate and at least about a molecular equivalent of an edible oil in the presence of a basic catalyst, are definitely more stable than a solution of a single pure vitamin A ester in the same oil. However, even the relatively good stability of these vitamin A products may be definitely enhanced by the incorporation in these oily products of a minor proportion of certain stabilizing agents.

A substantial number of such stabilizing agents have been tested with little or no success, but it has been found that alkylated phenolic or alkylated polyhydric phenolic compounds are surprisingly useful for this purpose. An unexpectedly high degree of stabilization is obtained by the addition of sufficient of these materials, generally less than about 3%, to the new products of this invention. The most suitable proportion of a given agent for a specific composition may be determined with the minimum of testing, using well-known methods of evaluation. In general, the most favorable proportion ranges from about 0.2% to 2.0% by weight based on the vitamin A alcohol content of the product, but certain materials may require more or less than this.

The alkyl group of the chosen alkylated phenol or polyhydric phenol has preferably at least about three carbon atoms and not more than about six, and the tertiary butyl group is particularly useful for this purpose. When a polyhydric phenol derivative, such as a compound related to catechol or hydroquinone, is used, it may take the form of a mono-lower alkyl ether. Among the most useful stabilizing agents for the new compositions of this invention are 3-tertiary butyl-4-hydroxyanisole, 2-tertiary butyl-4-hydroxyanisole, 2,6-di-tertiary butyl-4-methyl phenol, 2,2'-methylene bis-(4-methyl-6-tertiary butyl phenol), tertiary butyl meta-cresol, 2,5-di-tertiary butyl hydroquinone, structurally related compounds and mixtures of these. It is, of course, necessary to use stabilizers of low toxicity for pharmaceutical preparations. The stabilizer may be added to the novel oil-vitamin A compositions after removal of the alkaline catalyst.

The following examples are given by way of illustration and are not to be considered as the sole embodiment of this invention. It is to be understood that protection hereof is only to be limited by the specific wording of the appended claims.

Example I

Thirty-five grams of pure crystalline vitamin A acetate were melted with 65 grams of a high quality commercially-available corn oil. The melted mixture was subjected to a temperature of 55–60° C. under high vacuum to remove traces of water and ethanol. To the mixture was added one gram of dry sodium methylate and the reaction was heated for three hours under high vacuum. The product was dissolved in a suitable solvent and washed with water containing carbon dioxide and with pure water. The washed material was filtered and the solvent was removed under vacuum. The product obtained in this manner was a yellow oil assaying 1,060,000 USP units of vitamin A per gram. No vitamin A compound crystallized from the oil even after standing at —5° C. for at least two months. When a comparable amount of crystalline vitamin A acetate was simply dissolved in the same quality corn oil by warming without a catalyst, vitamin A acetate crystallized from solution on standing for only four hours at a similar low temperature.

The product obtained by the method described in this example is particularly useful for incorporation in various pharmaceuticals and foods. It resembles very closely natural preparations of vitamin A without their usual disadvantageous fishy odor and taste and without the presence of any neo-vitamin A of lower potency.

Example II

Four hundred and fifty-five grams of vitamin A acetate concentrate assaying 2,200,000 USP units per gram were melted at 45°–50° C. with 545 grams of edible cottonseed oil. The mixture was placed in a two-liter round-bottomed flask provided with a stirrer, thermometer, and capillary inlet for a stream of nitrogen. The flask was also equipped with an outlet above the liquid's surface connected to a high vacuum pump through a Dry Ice-cooled trap. While the mixture was agitated, 10.0 grams of dry sodium methylate were added. The reaction mixture was maintained at 55° C. under vacuum for three hours while subjecting the mixture to rapid agitation. The reaction product was then dissolved in 3 to 4 volumes of methylene chloride. The solution was washed once with water containing carbon dioxide and twice with water alone. The solvent was then removed under vacuum and 970 grams of mixed edible oil fatty acid esters of vitamin A, assaying 1,020,000 USP units of the vitamin per gram, were obtained. This product proved to be very useful for enriching various food products and pharmaceuticals with vitamin A. Upon extended storage at —5° C., there was no crystallization of vitamin A esters and the clear, light-colored, oily product demonstrated high stability.

Example III

A vitamin A-corn oil composition prepared as in Example I was treated with 1.0% by weight of a commercially available product known as butylated hydroxy anisole. The stabilizer readily dissolved and it was found that the resulting product exhibited an unusual degree of stability as compared to other liquid vitamin A products.

Example IV

A methylene chloride solution of vitamin A-cottonseed oil transesterified product prepared as in Example II above was treated with 0.5% of tertiary-butyl-meta cresol. The stabilizer dissolved in the mixture and the solvent was completely removed under vacuum. The product was found to be an unusually stable source of vitamin A, excellently adapted for incorporation into a variety of therapeutic products such as aqueous multivitamin emulsions and so forth.

What is claimed is:

1. A process for the preparation of a mixture of edible oil fatty acid esters of vitamin A, which process comprises contacting a lower alkanoic acid ester of vitamin A with an edible oil in the presence of an alkaline catalyst.

2. A process as claimed in claim 1 wherein the edible oil is of vegetable origin.

3. A process as claimed in claim 1 wherein an excess over a molecular proportion of edible oil is employed.

4. A therapeutically useful mixture of edible oil fatty acid esters of vitamin A as obtained by the process of claim 1.

5. A stabilized vitamin A composition which comprises the product of the process of claim 1 and a sufficient quantity of an alkylated phenolic compound to stabilize the composition.

6. A therapeutically useful mixture of vegtable oil fatty acid esters of vitamin A, which is highly oil-soluble, as prepared by the process of claim 2.

7. A stabilized vitamin A composition which comprises the product of the process of claim 2 and between about 0.2% and about 2.0% of butylated hydroxy anisole.

8. The product of the process of claim 3.

9. The composition of claim 5 wherein the stabilizing agent is present in a proportion of from about 0.2% to about 2.0%.

10. A product according to claim 6 wherein the vegetable oil is corn oil.

References Cited in the file of this patent

UNITED STATES PATENTS

| Number | Name | Date |
|---|---|---|
| 2,169,195 | Hickman | Aug. 8, 1939 |
| 2,229,173 | Hickman | Jan. 21, 1941 |
| 2,563,835 | Gribbins | Aug. 14, 1951 |

OTHER REFERENCES

Groggins; Units Processes in Organic Synthesis, McGraw-Hill, N. Y. City, 1938, page 534.